(12) United States Patent
Woods

(10) Patent No.: US 11,421,604 B2
(45) Date of Patent: Aug. 23, 2022

(54) HYBRID GAS TURBINE ENGINE WITH BLEED SYSTEM IMPROVEMENTS

(71) Applicant: Hamilton Sundstrand Corporation, Charlotte, NC (US)

(72) Inventor: Adam Woods, Suffield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 538 days.

(21) Appl. No.: 16/502,173

(22) Filed: Jul. 3, 2019

(65) Prior Publication Data

US 2021/0003080 A1 Jan. 7, 2021

(51) Int. Cl.
*F02C 9/00* (2006.01)
*F02C 9/18* (2006.01)
(Continued)

(52) U.S. Cl.
CPC ............... *F02C 9/18* (2013.01); *B64D 13/02* (2013.01); *B64D 13/06* (2013.01); *B64D 13/08* (2013.01);
(Continued)

(58) Field of Classification Search
CPC ........... F02C 9/18; B64D 15/04; B64D 15/02; B64D 27/14; B64D 27/02;
(Continued)

(56) References Cited

U.S. PATENT DOCUMENTS 7,970,497 B2   6/2011  Derouineau et al.
8,572,996 B2 * 11/2013  Dittmar .................. B64D 13/06
                                                          62/236
(Continued)

FOREIGN PATENT DOCUMENTS

EP   2557038 A2   2/2013
EP   3219620 A1   9/2017

OTHER PUBLICATIONS

Gubisch, M., UTC to test hybrid-electric propulsion system on Dash 8. https://www.flightglobal.com/news/articles/utc-to-test-hybrid-electric-propulsion-system-on-da-456942/. Mar. 27, 2019.
(Continued)

*Primary Examiner* — Phutthiwat Wongwian
*Assistant Examiner* — Sherman D Manley
(74) *Attorney, Agent, or Firm* — Carlson, Gaskey & Olds, P.C.

(57) ABSTRACT

An architecture for powering systems on an aircraft has a gas turbine engine including a main compressor, a combustor, and a turbine. The turbine powers the main compressor, and further powers a propulsor. The turbine is operably connected to drive a generator. The generator is connected to store generated power at a battery. The battery is connected to provide power to a motor from the propulsor such that the propulsor can be selectively driven by both the motor and the turbine. A bleed air control system and a tap for selectively tapping compressed air from the main compressor, and a control valve for delivering at least one of the tapped compressed air or a compressed alternative air to bleed systems on an associated aircraft. An electric bleed compressor selectively compresses the compressed alternative air. The electric bleed compressor is powered by the battery. A control for controlling the control valve to selectively deliver at least one of the tapped compressed air and the compressed alternative air to the bleed systems. An aircraft is also disclosed.

20 Claims, 2 Drawing Sheets

(51) Int. Cl.
*B64D 13/02* (2006.01)
*B64D 13/06* (2006.01)
*B64D 13/08* (2006.01)
*B64D 15/04* (2006.01)
*B64D 27/14* (2006.01)

(52) U.S. Cl.
CPC ............. *B64D 15/04* (2013.01); *B64D 27/14* (2013.01); *B64D 2013/0607* (2013.01); *B64D 2013/0618* (2013.01); *F05D 2220/323* (2013.01)

(58) Field of Classification Search
CPC .... B64D 2013/0607; B64D 2013/0618; B64D 13/02; B64D 13/06; B64D 13/08; F05D 2220/323; Y02T 50/50; Y02T 50/60
See application file for complete search history.

(56) References Cited

U.S. PATENT DOCUMENTS

| | | | |
|---|---|---|---|
| 9,964,036 | B2 | 5/2018 | Schwarz et al. |
| 10,144,521 | B2 | 12/2018 | DeRoy |
| 11,149,649 | B2* | 10/2021 | Terwilliger ............ B64D 27/10 |
| 2006/0260323 | A1* | 11/2006 | Moulebhar ............... F02C 6/08 60/793 |
| 2007/0101721 | A1* | 5/2007 | Dooley ................... F02C 7/268 60/721 |
| 2013/0040545 | A1* | 2/2013 | Finney ................... B64D 13/06 454/71 |
| 2013/0147204 | A1* | 6/2013 | Botti ....................... F02B 63/04 903/903 |
| 2015/0013306 | A1* | 1/2015 | Shelley ...................... F02K 5/00 60/224 |
| 2015/0275758 | A1* | 10/2015 | Foutch .................... F02C 7/047 60/785 |
| 2016/0061053 | A1* | 3/2016 | Thomassin ............. F01D 17/06 415/69 |
| 2017/0057650 | A1* | 3/2017 | Walter-Robinson ........................ H02J 7/0068 |
| 2017/0106985 | A1* | 4/2017 | Stieger ................... B64D 13/02 |
| 2017/0174357 | A1 | 6/2017 | Ramos-Paul Lastra et al. |
| 2017/0190441 | A1* | 7/2017 | Mackin ................... F01D 25/36 |
| 2017/0268423 | A1* | 9/2017 | Schwarz ................ B64D 15/04 |
| 2018/0003072 | A1 | 1/2018 | Lents et al. |
| 2018/0105277 | A1 | 4/2018 | Wiegers et al. |
| 2018/0266329 | A1* | 9/2018 | Mackin ..................... F02C 7/36 |
| 2019/0322379 | A1* | 10/2019 | Mackin ................... F02C 7/057 |
| 2019/0323426 | A1* | 10/2019 | Mackin ................. B64D 27/10 |
| 2019/0323427 | A1* | 10/2019 | Mackin ................. B64D 27/24 |

OTHER PUBLICATIONS

Friedrich, C., Robertson, A. (2014). Hybrid-electric propulsion for automotive and aviation applications. CEAS Aeronautical Journal, vol. 6, No. 2, Dec. 30, 2014., pp. 279-290.

European Search Report for EP Application No. 19214380.8 dated Jun. 23, 2020.

* cited by examiner

HYBRID GAS TURBINE ENGINE WITH BLEED SYSTEM IMPROVEMENTS

BACKGROUND

This application relates to an architecture for a hybrid gas turbine engine wherein there are improvements to a bleed air system.

Gas turbine engines are known and typically include a propulsor (fan or propeller) driven by a turbine to provide propulsion. Air is also delivered into a compressor by the propulsor and compressed. The compressed air is mixed with fuel and ignited in a combustor, and products of that combustion pass downstream over the turbine, driving the turbine to rotate.

Historically, the gas turbine engine has also driven a generator to generate electrical power for various uses on an associated aircraft.

More recently, so-called hybrid systems have been proposed. In a hybrid propulsion architecture, power generated at the generator is stored in a battery. This power is selectively utilized to supplement the drive of the propulsor during certain portions of a flight envelope. As an example, at takeoff of an associated aircraft, the required power is at its highest.

Typically, a gas turbine engine has been sized to provide the takeoff power. However, in a hybrid system, the gas turbine engine may be sized smaller, and a supplemental electric power to the propulsor may be utilized. Various gear transmissions have been proposed which allow both electric power and the power from the turbine to drive the propulsor during these higher power situations.

As known, there are other systems associated with an aircraft which are typically powered by the gas turbine engine.

SUMMARY

An architecture for powering systems on an aircraft has a gas turbine engine including a main compressor, a combustor, and a turbine. The turbine powers the main compressor, and further powers a propulsor. The turbine is operably connected to drive a generator. The generator is connected to store generated power at a battery. The battery is connected to provide power to a motor from the propulsor such that the propulsor can be selectively driven by both the motor and the turbine. A bleed air control system and a tap for selectively tapping compressed air from the main compressor, and a control valve for delivering at least one of the tapped compressed air or a compressed alternative air to bleed systems on an associated aircraft. An electric bleed compressor selectively compresses the compressed alternative air. The electric bleed compressor is powered by the battery. A control for controlling the control valve to selectively deliver at least one of the tapped compressed air and the compressed alternative air to the bleed systems.

An aircraft is also disclosed.

These and other features may be best understood from the following drawings and specification.

DETAILED DESCRIPTION

Figure 1:
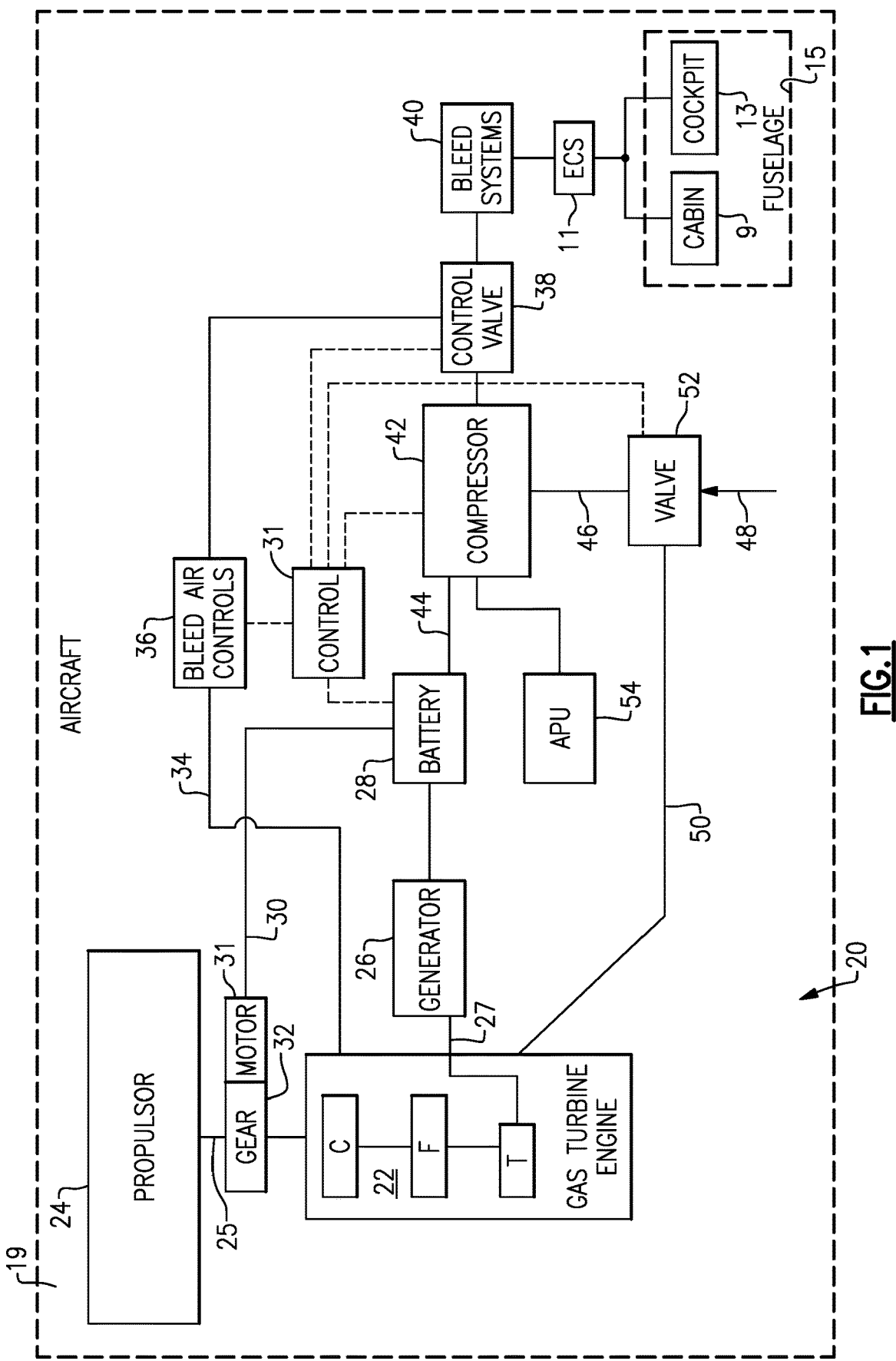
FIG. 1 schematically shows a system for providing bleed air in a hybrid gas turbine engine architecture.

An architecture 20 is illustrated having a gas turbine engine 22 in FIG. 1. Gas turbine engine 22 drives a propulsor 24 through a shaft 25. This is mounted on an aircraft 19, shown schematically. As known, the propulsor 24 delivers air into a main compressor C. The main compressor C delivers air into a combustor F where it is mixed with fuel and ignited. Products of this combustion pass downstream over a turbine T driving it to rotate. The turbine T drives a shaft 25.

More recently, so-called hybrid architectures have been developed. In a hybrid system, a generator 26 is driven through a transmission 27, such as a power takeoff shaft, driven by the turbine T. The generator 26 stores power in a battery 28.

Under certain conditions, the battery 28 is utilized to power a gearbox 32 through a power connection 30. Some electric motor 31 or other drive is powered by the battery to supplement rotation through the gearbox. The gearbox 32 supplements the drive to the shaft 25.

In one proposed application, this power is utilized at takeoff of aircraft 19 such that the size of the gas turbine engine 22 may be maintained smaller. The power provided to the propulsor 24 from the gas turbine engine 22 is supplemented due to the hybrid power supply to the gearbox 32 from battery 28. The power from battery 28 may be utilized at takeoff and other relatively high power conditions, but can be reduced under lower power conditions such as cruise. This allows the use of a smaller gas turbine engine 22.

The control 31 is operable to supply power from the battery 28 to the transmission 32 through the line 30 under such conditions.

A tap 34 to compressed air from main compressor C is shown and provides compressed air to a bleed air controls 36. Bleed air controls 36 are provided on most aircraft and would include a plurality of valves, heat exchangers, and sensors to provide air to bleed air systems 40 associated with a fuselage 25 of aircraft 19. The bleed air systems 40 could be environmental control system 11 for providing breathing air such as to an aircraft cabin 9 or cockpit 13. In addition, wing anti-ice air, inert gas, electronic cooling and waste systems can also be part of the bleed systems 40. A control valve 38 is shown selectively communicating air from the bleed air controls 36 to the bleed systems 40. While a single tap 34 is shown, it should be understood that a plurality of taps may be utilized to supply air to the bleed air controls 36.

However, with the provision of the battery 28, alternatives to the use of the bleed air controls 36 may be provided. It should be understood the bleed air controls 36 does tap air 34 which has compressed at the compressor C. This can reduce the efficiency of the overall architecture 20. Thus, bleed compressor 42 is selectively powered by the battery 28 through a connection 44. Air may come from an outside source 48 through a valve 52 to a connection 46 to the compressor 42.

As shown, an auxiliary power unit (APU) 54 may also provide power to the bleed compressor 42. The APU 54 may power the bleed compressor when the bleed systems 40 need supplemental performance. As an example, there may be conditions where the battery 28 has failed, or is otherwise being maintain exclusively for propulsor drive demand.

During conditions when there is not necessarily power being delivered from the battery 28 to the gearbox 32, the power may be utilized for the auxiliary function of powering the bleed compressor 42. When the battery 28 is driving the propulsor 24, bleed air controls 36 may supply the air to bleed air systems 40. The valve 38, battery 28, bleed compressor 42, and valve 52 may all be controlled by controller 31. Among the times when the battery may drive the bleed compressor 42 would be lower power operation such as idle or cruise.

Figure 2:
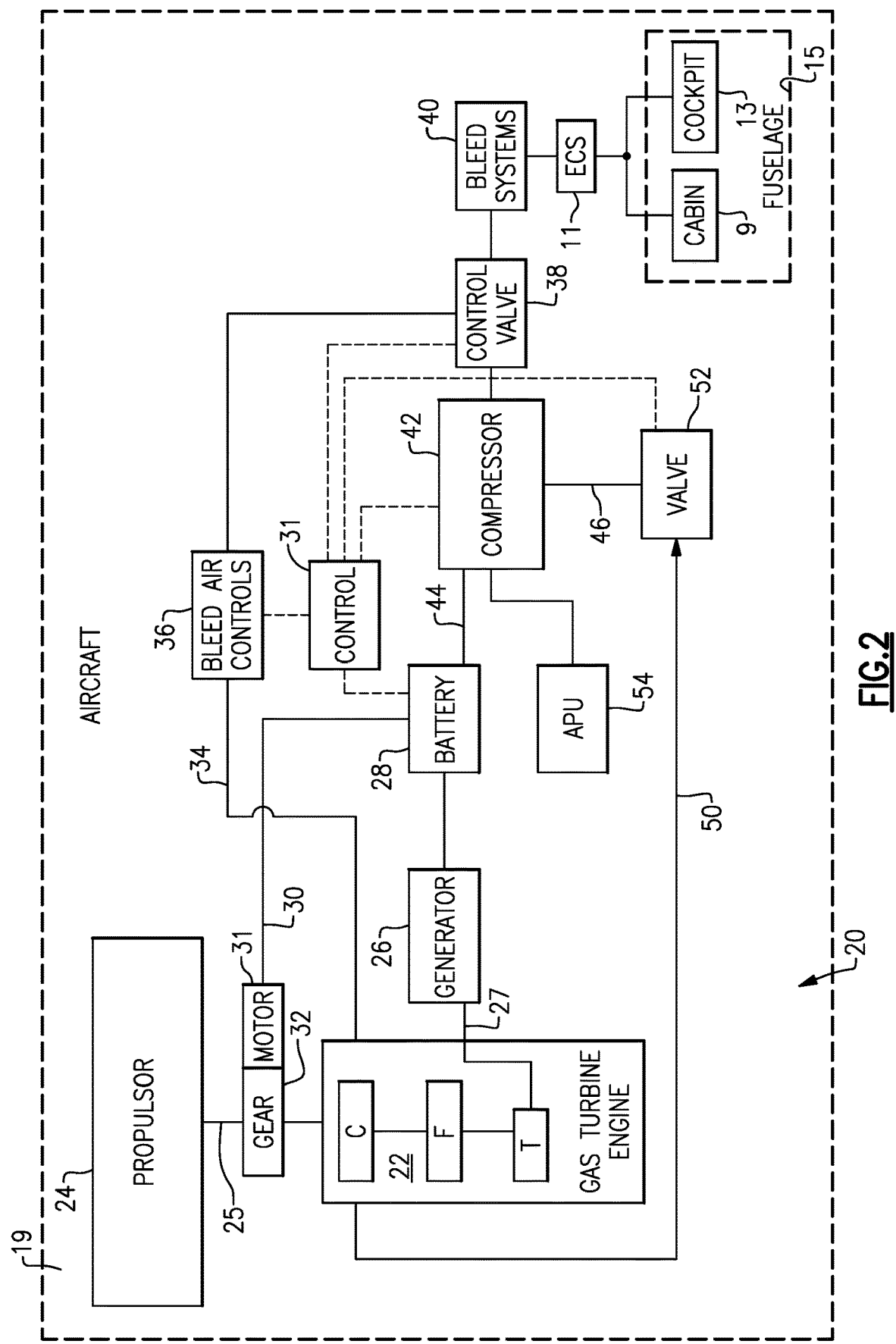
FIG. 2 shows an alternative embodiment.

FIG. 2 shows an alternative embodiment. In the FIG. 2 embodiment a tap 50 is also taken from the main compressor 22 and sent to the valve 52. This is in place of the ambient air from source 48. Tap 50 may be from a lower pressure location than tap 34, or even the same location. When tap 50 is sent through the bleed compressor 42, it allows the use of air which has been compressed to a lesser extent in the engine 22.

Otherwise, the FIG. 2 embodiment may operate similar to the FIG. 1 embodiment.

An aircraft under this disclosure could be said to include a fuselage. The fuselage mounts at least one gas turbine engine including a main compressor, a combustor and a turbine. The turbine powers the main compressor and further powers a propulsor. The turbine is also operably connected to drive a generator. The generator is connected to store generated power at a battery. The battery is connected to provide power to a motor from the propulsor such that the propulsor can be selectively driven by both the battery and the turbine. An environmental control system supplies air to a cockpit and a cabin in the fuselage. A bleed air control system and a tap to selectively tap compressed air from the main compressor and a control valve to deliver at least one of the tapped compressor air and a compressed alternative air to the environmental control system. An electric bleed compressor selectively compresses alternative air and delivers the compressed alternative air to the environmental control system. The electric bleed compressor is powered by the battery. A control for the control valve programmed to move the valve to selectively deliver at least one of the tapped compressed air and the compressed alternative air to the environmental control system.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. An architecture for powering systems on an aircraft comprising:
   a gas turbine engine including a main compressor, a combustor, and a turbine, said turbine powering said main compressor, and further powering a propulsor;
   said turbine also being operably connected to drive a generator, said generator being connected to store generated power at a battery, said battery being connected to provide power to a motor to power said propulsor such that said propulsor can be selectively driven by both said motor and said turbine, said generator and said motor being distinct components;
   a bleed air control system, and a first tap for selectively tapping compressed air from said main compressor, and a control valve for delivering at least one of said tapped compressed air or a compressed alternative air to bleed systems on an associated aircraft;
   an electric bleed compressor for selectively compressing the compressed alternative air, said electric bleed compressor powered by said battery, and a control for controlling said control valve to selectively deliver at least one of said tapped compressed air and said compressed alternative air to said bleed systems; and
   said compressed alternative air being at least one of ambient air tapped from a location other than said first tap or compressed air from a second tap from said main compressor.

2. The architecture as set forth in claim 1, wherein said battery powering said electric bleed compressor to deliver said compressed alternative air to said bleed systems at lower power operation of the associated aircraft.

3. The architecture as set forth in claim 2, wherein said lower power operation includes at least one of cruise and idle conditions.

4. The architecture as set forth in claim 3, wherein said bleed air control system providing tapped compressed air from said first tap to said bleed systems during higher power operation.

5. The architecture as set forth in claim 4, wherein said high power operation includes takeoff of the associated aircraft.

6. The architecture as set forth in claim 1, wherein said alternative air is ambient air.

7. The architecture as set forth in claim 1, wherein said alternative air is from said second tap.

8. The architecture as set forth in claim 1, wherein said bleed systems include an environmental control system.

9. The architecture as set forth in claim 8, wherein said bleed systems also include anti-icing systems.

10. The architecture as set forth in claim 1, wherein said bleed air control system providing tapped compressed air to said bleed systems during higher power operation.

11. The architecture as set forth in claim 1, wherein an auxiliary power unit is provided on the associated aircraft, and the auxiliary power unit selectively powering said electric bleed compressor under certain conditions.

12. The aircraft as set forth in claim 11, wherein an auxiliary power unit is provided on the aircraft, and the auxiliary power unit selectively powering said electric bleed compressor under certain conditions.

13. An aircraft comprising:
   a fuselage, said fuselage mounting at least one gas turbine engine including a main compressor, a combustor and a turbine, said turbine powering said main compressor and further powering a propulsor;
   said turbine also being operably connected to drive a generator, said generator being connected to store generated power at a battery, said battery being connected to provide power to a motor for said propulsor such that said propulsor can be selectively driven by both said motor and said turbine, said generator and said motor being distinct components;
   an environmental control system for supplying air to a cockpit and a cabin in said fuselage, a bleed air control system and a first tap for selectively tapping compressed from said main compressor and a control valve for delivering at least one of said tapped compressor air and a compressed alternative air to said environmental control system;
   an electric bleed compressor for selectively compressing the compressed alternative air, said electric bleed compressor powered by said battery, and a control for controlling said control valve to selectively deliver at least one of said tapped compressed air and said compressed alternative air to said environmental control system; and
   said compressed alternative air being at least one of ambient air tapped from a location other than said first tap or compressed air from a second tap from said main compressor.

14. The aircraft as set forth in claim 12, wherein said battery powering said electric bleed compressor to deliver said compressed alternative air to said bleed systems at lower power operation of the associated aircraft, and said bleed air control system providing tapped compressed air from said first tap to said bleed systems during higher power operation.

15. The aircraft as set forth in claim 14, wherein said lower power operation includes at least one of cruise and idle conditions.

16. The aircraft as set forth in claim 15, wherein said high power operation includes takeoff of the associated aircraft.

17. The architecture as set forth in claim 13, wherein said alternative air is also tapped compressed air from said main compressor.

18. The aircraft as set forth in claim 17, wherein said alternative air is from said second tap.

19. The aircraft as set forth in claim 13, wherein air is also delivered through said control valve to an anti-icing systems.

20. The aircraft as set forth in claim 13, wherein said bleed air control system providing tapped compressed air to said bleed systems during higher power operation.

* * * * *